United States Patent
Minamino et al.

(10) Patent No.: US 11,065,535 B2
(45) Date of Patent: Jul. 20, 2021

(54) INFORMATION PROCESSING DEVICE, SIGNAL CONVERSION METHOD AND PROGRAM

(71) Applicant: Sony Interactive Entertainment Inc., Tokyo (JP)

(72) Inventors: Takanori Minamino, Kanagawa (JP); Yoshiyuki Imada, Chiba (JP); Kenzo Nishikawa, Tokyo (JP); Dean Sofer, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 88 days.

(21) Appl. No.: 16/166,769

(22) Filed: Oct. 22, 2018

(65) Prior Publication Data

US 2019/0126144 A1  May 2, 2019

Related U.S. Application Data

(60) Provisional application No. 62/580,347, filed on Nov. 1, 2017.

(51) Int. Cl.
*A63F 13/245*  (2014.01)
*G06F 3/0338*  (2013.01)
(Continued)

(52) U.S. Cl.
CPC .......... *A63F 13/245* (2014.09); *A63F 13/218* (2014.09); *A63F 13/22* (2014.09);
(Continued)

(58) Field of Classification Search
CPC ...... A63F 13/245; A63F 13/218; A63F 13/22; A63F 13/428
See application file for complete search history.

(56) References Cited

U.S. PATENT DOCUMENTS 8,622,833 B2  1/2014  Kake
8,781,151 B2  7/2014  Marks
(Continued)

FOREIGN PATENT DOCUMENTS

JP  2008011980 A  1/2008
JP  2008015679    1/2008
(Continued)

OTHER PUBLICATIONS

Notification of Reason for Refusal for corresponding JP Application 2018-101622, 5 pages, dated May 21, 2019.

*Primary Examiner* — Tramar Harper
*Assistant Examiner* — Jeffrey K Wong
(74) *Attorney, Agent, or Firm* — Matthew B. Dernier, Esq.

(57) ABSTRACT

Disclosed herein is an information processing device that provides an operation signal of an analog stick to a game, including: a conversion processing unit configured to convert a detection value obtained by detection of a movement of a controller into an analog stick signal; and an output processing unit configured to provide the analog stick signal obtained by the conversion to the game. The conversion processing unit includes a first calculation unit configured to calculate a first signal from a detected angular velocity, a second calculation unit configured to calculate a second signal according to a deviation amount between a direction in which the controller is directed and a reference direction, an addition unit configured to add the first signal and the second signal to generate a motion operation signal, and an analog stick signal generation unit configured to generate an analog stick signal from the motion operation signal.

6 Claims, 14 Drawing Sheets

(51) Int. Cl.
 *G05G 9/047* (2006.01)
 *A63F 13/218* (2014.01)
 *A63F 13/22* (2014.01)
 *A63F 13/428* (2014.01)

(52) U.S. Cl.
 CPC .......... *A63F 13/428* (2014.09); *G05G 9/047* (2013.01); *G06F 3/0338* (2013.01)

(56) References Cited

U.S. PATENT DOCUMENTS

| | | |
|---|---|---|
| 10,010,789 B2 | 7/2018 | Koizumi |
| 2008/0009332 A1 | 1/2008 | Kake |
| 2008/0080789 A1 | 4/2008 | Marks |
| 2010/0169824 A1* | 7/2010 | Sawai ................ G06F 3/0346 715/784 |
| 2012/0289336 A1 | 11/2012 | Matsuda |
| 2013/0297246 A1* | 11/2013 | Wilson ................ G06F 3/0346 702/104 |
| 2016/0361641 A1 | 12/2016 | Koizumi |

FOREIGN PATENT DOCUMENTS

| | | |
|---|---|---|
| JP | 2009535175 A | 10/2009 |
| JP | 2010531520 A | 9/2010 |
| JP | 2017004523 A | 1/2017 |
| WO | 2007130833 A2 | 11/2007 |

\* cited by examiner

FIG.1
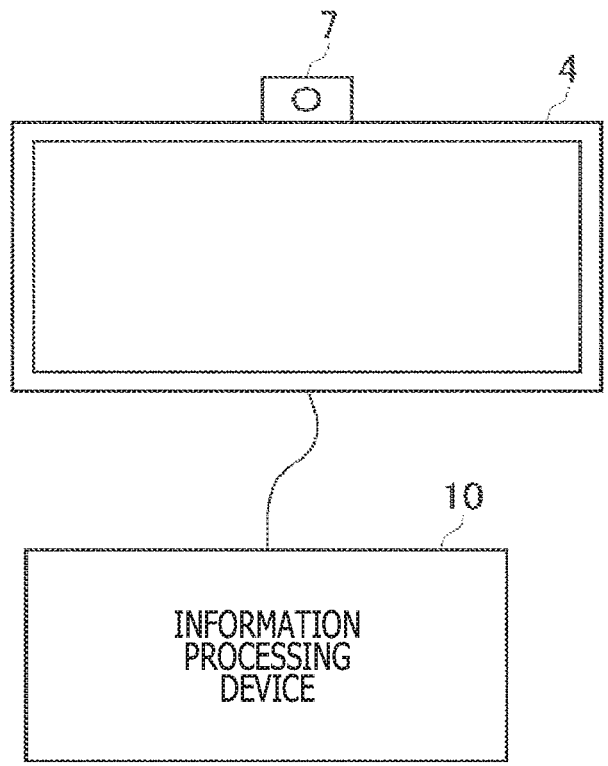
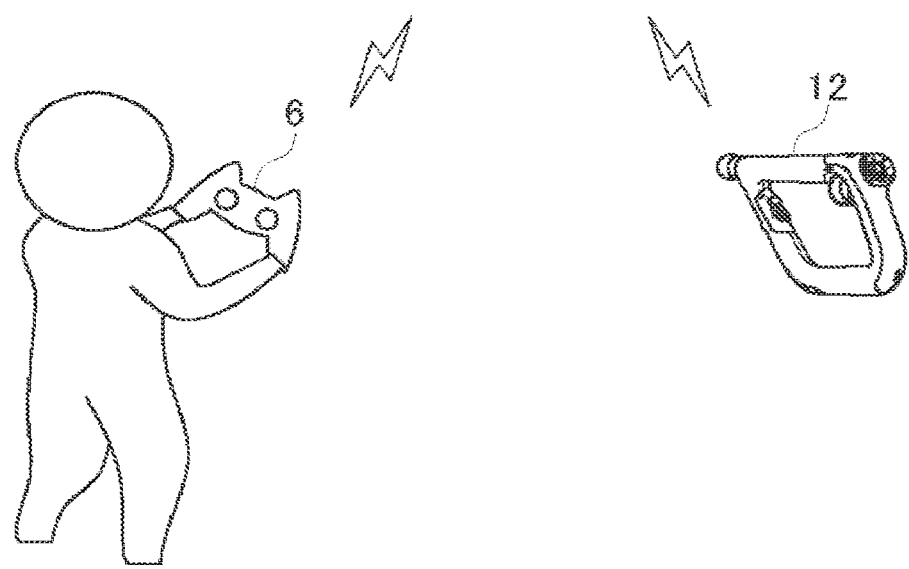

FIG.10D

|  | SIGNAL VALUE | SIGNAL VALUE TO WHICH ROUNDING ERROR IN PRECEDING CYCLE IS ADDED | SIGNAL VALUE AFTER ROUNDING PROCESS | ROUNDING ERROR |
|---|---|---|---|---|
| N | 130.4 | 130.4 | 130 | 0.4 |
| N+1 | 125.3 | 125.7 | 126 | −0.3 |
| N+2 | 132.6 | 132.3 | 132 | 0.3 |
| N+3 | 113.4 | 113.7 | 114 | −0.3 |

FIG. 13

| NAME | MOTION | INPUTTING UNIT OF CONTROLLER | CHARACTER MOVEMENT |
|---|---|---|---|
| ROTATE | ROLLING (FORWARD ROTATION DIRECTION) | SQUARE MARK BUTTON | RELOAD |
| TILT_UP | PITCHING (FORWARD ROTATION DIRECTION) | TRIANGLE MARK BUTTON | SWITCH WEAPONS |
| MOVE_UP | YAW AXIS MOVEMENT (POSITIVE DIRECTION) | CROSS MARK BUTTON | JUMP |
| MOVE_FORWARD | ROLL AXIS DIRECTION (NEGATIVE DIRECTION) | R3 BUTTON | MELEE ATTACK |
| AIM | YAW AXIS MOVEMENT (POSITIVE DIRECTION) | L2 BUTTON | AIMING WITH SCOPE |

200

FIG.14
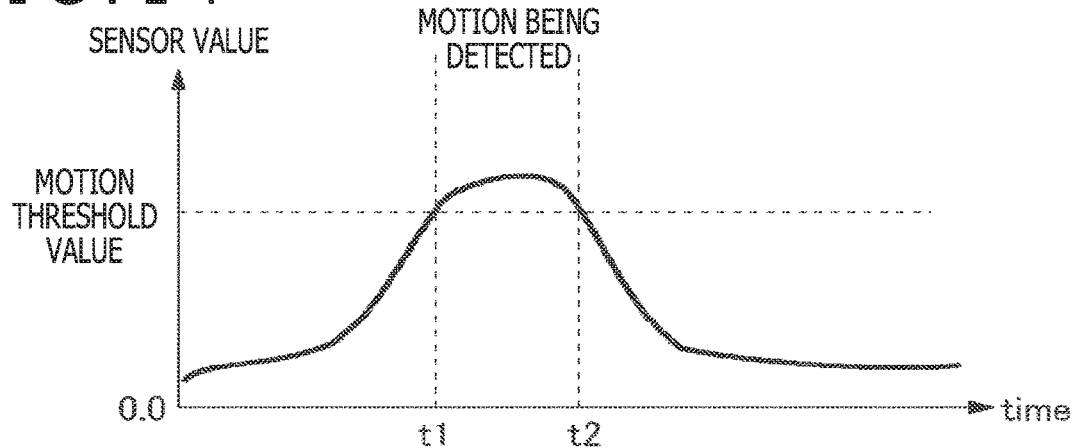
FIG.15
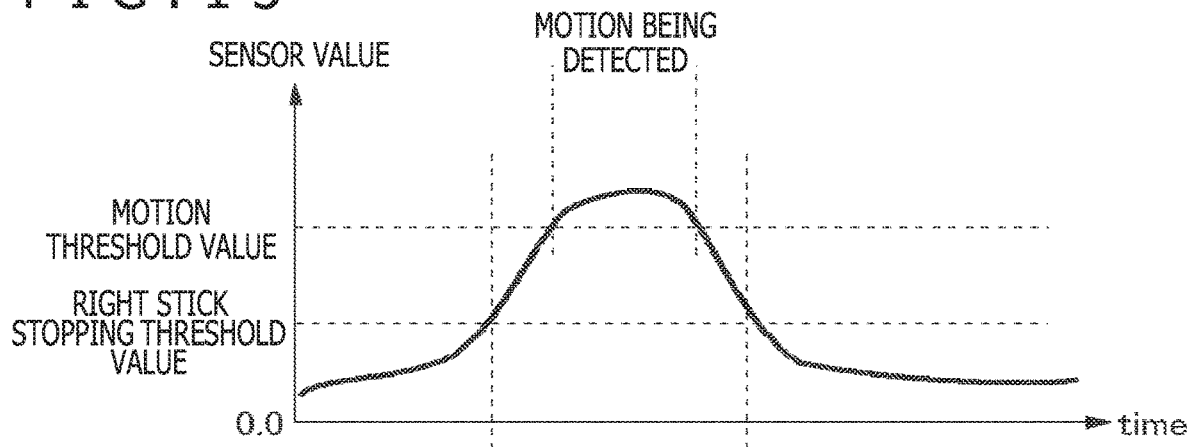
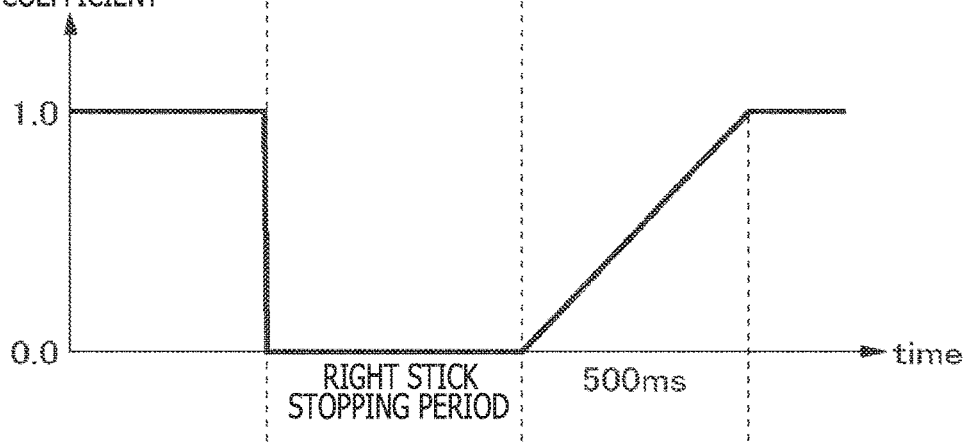

INFORMATION PROCESSING DEVICE, SIGNAL CONVERSION METHOD AND PROGRAM

CROSS REFERENCE TO RELATED APPLICATIONS

This application claims the benefit of U.S. Provisional Patent Application No. 62/580,347, filed Nov. 1, 2017, the entire disclosure of which is hereby incorporated by reference.

BACKGROUND

The present disclosure relates to a technology for providing an operation signal of an inputting device to a game.

A dedicated game machine accepts an operation signal of an inputting unit of a game controller and provides the operation signal to a game. U.S. Patent Application Publication No. 2012/0289336 discloses a keyboard including a function of a game controller. The keyboard includes an allocation key to which a function of an operation button of the game controller is allocated, a pointing stick and a modification key. If the pointing stick is operated in a state in which the modification key is operated, then an operation signal of an analog stick of the game controller is outputted and provided to a game.

SUMMARY

In recent years, a game controller having a special shape used for a specific kind of a game has been sold, and a gun controller used in a gun shooting game is a representative of the game controller just described. While game software is configured such that an operation signal of a general-purpose game controller can be processed, a dedicated controller such as a gun controller is an optional device to the end. Therefore, there is a case in which software is not ready for an inputting signal of a dedicated controller.

At the present, if game software is not ready for an inputting signal of a dedicated controller, then the user does not have any measures that can be used for the game. Usually, since the dedicated controller allows an intuitive operation of the user, it is preferable to implement an environment in which the user can perform game play with the dedicated controller also for a game that is not ready for the dedicated controller.

Therefore, it is desirable to provide a technology that makes it possible to utilize a dedicated controller such as a gun controller or the like in an information processing device that provides an operation signal of an inputting unit of a general-purpose game controller to a game.

According to an aspect of the present disclosure, there is provided an information processing device that provides an operation signal of an analog stick to a game, the information processing device including a conversion processing unit configured to convert a detection value obtained by detection of a movement of a controller into an analog stick signal, and an output processing unit configured to provide the analog stick signal obtained by the conversion to the game, wherein the conversion processing unit includes a first calculation unit configured to calculate a first signal from a detected angular velocity, a second calculation unit configured to calculate a second signal according to a deviation amount between a direction in which the controller is directed and a reference direction, an addition unit configured to add the first signal and the second signal to generate a motion operation signal, and an analog stick signal generation unit configured to generate an analog stick signal from the motion operation signal.

According to another aspect of the present disclosure, there is provided a signal conversion method for converting a detection value when a motion of a controller is detected by an information processing device, which provides an operation signal of an analog stick to a game, into an operation signal of the analog stick, the signal conversion method including acquiring the detection value of the detected motion of the controller, calculating a first signal from a detected angular velocity, calculating a second signal from a deviation between a direction in which the controller is directed and a reference direction, generating a motion operation signal by adding the first signal and the second signal, and generating an analog stick signal from the motion operation signal.

It is to be noted that anything obtained by conversion of an arbitrary combination of the components described above and a representation of the present disclosure between a method, a device, a system, a recording medium, a computer program and so forth is effective as a mode of the present disclosure.

With the present disclosure, for an information processing device that provides an operation signal of an inputting unit of a general-purpose game controller to a game, a technology is provided which makes it possible to utilize a dedicated controller such as a gun controller of the like.

BRIEF DESCRIPTION OF THE DRAWINGS

FIG. 1 is a view depicting an information processing system according to an embodiment;

FIGS. 10A to 10E are views illustrating a conversion process of a motion sensor signal;

FIG. 13 is a view depicting a correspondence relationship between motions of the second controller and inputting units of the first controller;

FIG. 14 is a view illustrating a motion detection technique;

FIG. 15 is a different view illustrating the motion detection technique.

DETAILED DESCRIPTION OF THE PREFERRED EMBODIMENTS

Figure 2A:
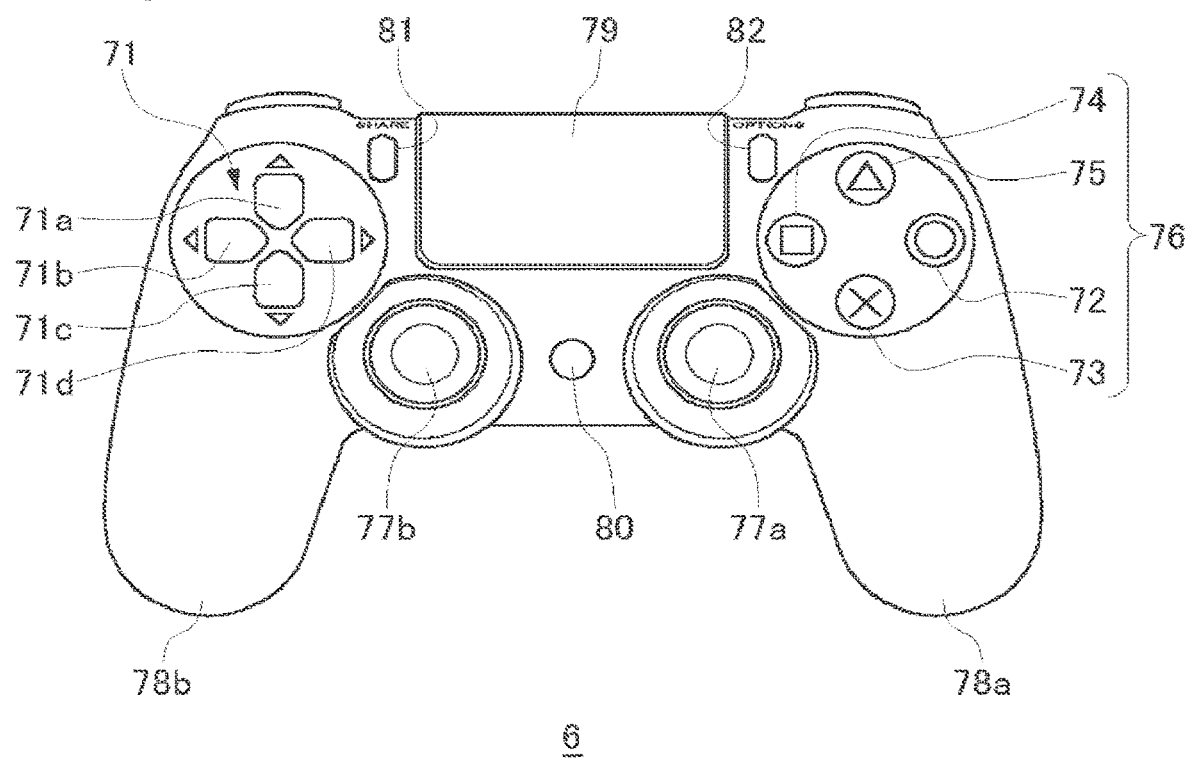
FIG. 2A is a top plan view of a first controller.

FIG. 1 depicts an information processing system 1 according to an embodiment. The information processing system 1 includes an information processing device 10, an outputting device 4 having a displaying function such as a television set or the like, and a first controller 6 that is an inputting device. The information processing device 10 is a game device that executes game software and is coupled for communication with the first controller 6. While, in the example depicted in FIG. 1, the information processing device 10 and the first controller 6 are coupled to each other by wireless coupling, the information processing device 10 and the first controller 6 may otherwise be coupled to each other by a cable. A camera 7 that is an image pickup device is provided in the proximity of the outputting device 4, and an image of the space in front of the outputting device 4 is picked up.

The first controller 6 is a general-purpose game controller that is operated by a user and transmits a game operation signal to the information processing device 10, and is configured including a plurality of inputting units such as various buttons, an analog stick and so forth. The information processing device 10 accepts a game operation signal from the first controller 6 and provides the accepted signal to a game, and the game reflects the game operation signal on a movement of a game character in the game space.

Further, the information processing system 1 includes a second controller 12 that is an inputting device. The second controller 12 of the embodiment is a dedicated game controller (gun controller) used in a gun shooting game, and includes a plurality of inputting units similarly to the first controller 6 and incorporates a motion sensor therein. It is to be noted that, if the user operates an inputting unit of the second controller 12, then a game operation signal similar to that of the first controller 6 is outputted to the information processing device 10. Accordingly, the game executed in the information processing device 10 processes the game operation signal from the second controller 12 without any problem.

Game software ready for the second controller 12 has a function for accepting a detection value of the motion sensor in the second controller 12 as the game operation signal. Consequently, the user can input a command to the game by moving the second controller 12 or changing the posture of the second controller 12. This makes it possible, together with a special shape of the second controller 12, to implement an intuitive operation of the user and give a game immersion sensitivity deeper than that by the general-purpose first controller 6 to the user. It is to be noted that, where the second controller 12 is used, the user would input, while inputting a command by moving the second controller 12, a command also by operating an inputting unit to perform game play by an intuitive operation.

In the following, the inputting units provided on the first controller 6 are described.

[Configuration of Upper Face Portion]

FIG. 2A is a top plan view of the first controller 6. The user would grasp a left side grip portion 78b and a right side grip portion 78a by the left hand and the right hand, respectively, and operate the first controller 6. On an upper face of a housing of the first controller 6, direction buttons 71, analog sticks 77a and 77b and operation buttons 76 are provided. The direction buttons 71 include an upward button 71a, a leftward button 71b, a downward button 71c and a rightward button 71d. On the four operation buttons 76, marks different from each other are printed in colors different from each other in order to distinguish the operation buttons 76, and a red circle mark, a blue cross mark, a purple square mark and a green triangle mark are printed on a circle mark button 72, a cross mark button 73, a square mark button 74 and a triangle mark button 75, respectively.

The right analog stick 77a and the left analog stick 77b are inputting units for inputting a direction and a tilt amount. The right analog stick 77a and the left analog stick 77b function also as depression buttons that are depressed if they are pushed down by the user and return to their original position if the user removes the hand from the analog stick. A button function by depression using the right analog stick 77a is hereinafter referred to as R3 button and another button function by depression using the left analog stick 77b is hereinafter referred to as L3 button. On the upper face of the housing, a touch pad 79 is provided in a flat region between the direction buttons 71 and the operation buttons 76. The touch pad 79 functions as a depression button that moves downwardly by depression by the user and returns to its original position if the user removes the hand from the tough pad 79.

A home button 80 is provided between the right analog stick 77a and the left analog stick 77b. The home button 80 is used to switch on the power supply to the first controller 6 to simultaneously activate the communication function for establishing wireless coupling to the information processing device 10. After the first controller 6 and the information processing device 10 are coupled to each other, the home button 80 is used also to cause the outputting device 4 to display of a menu screen image.

A SHARE button 81 is provided on the left side of the touch pad 79. The SHARE button 81 is utilized to input an instruction from the user to system software. An OPTIONS button 82 is provided at the right side of the touch pad 79. The OPTIONS button 82 is utilized to input an instruction from the user to the game. The SHARE button 81 and the OPTIONS button 82 may be formed each as a push type button.

[Configuration of Rear Side Face Portion]

Figure 2B:
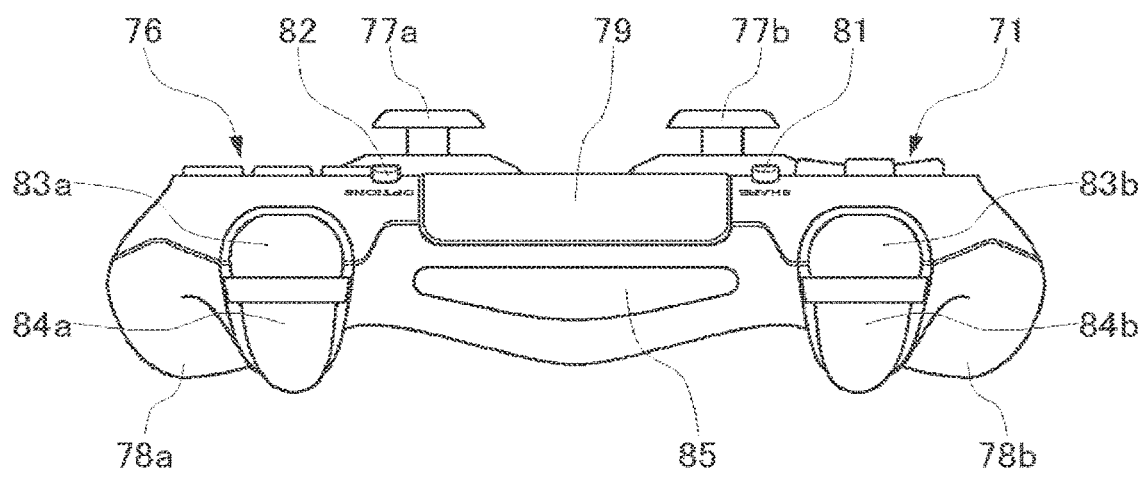
FIG. 2B is a side elevational view of a rear side elevational view of the first controller.

FIG. 2B is a rear side elevational view of the first controller 6. The touch pad 79 extends in a downwardly bent state from the upper face of the housing on the upper side of the rear face of the housing of the first controller 6, and a horizontally elongated light emitting portion 85 is provided on the lower side of the rear face of the housing. The light emitting unit 85 includes LEDs (Light-Emitting Diodes) of red (R), green (G) and blue (B), and emits light in accordance with light emission color information transmitted from the information processing device 10. On the rear side face of the housing, an R1 button 83a, an R2 button 84a, an L1 button 83b and an L2 button 84b are provided at leftwardly and rightwardly symmetrical positions in a longitudinal direction. The R1 button 83a and the R2 button 84a are operated by the forefinger and the middle finger of the right hand of the user, respectively, and the L1 button 83b and the L2 button 84b are operated by the forefinger and the middle finger of the left hand of the user, respectively. The R1 button 83a and the L1 button 83b at the upper side may be configured as push type buttons, and the R2 button 84a and the L2 button 84b at the lower side may be configured as trigger type buttons supported for pivotal motion.

Figure 3:
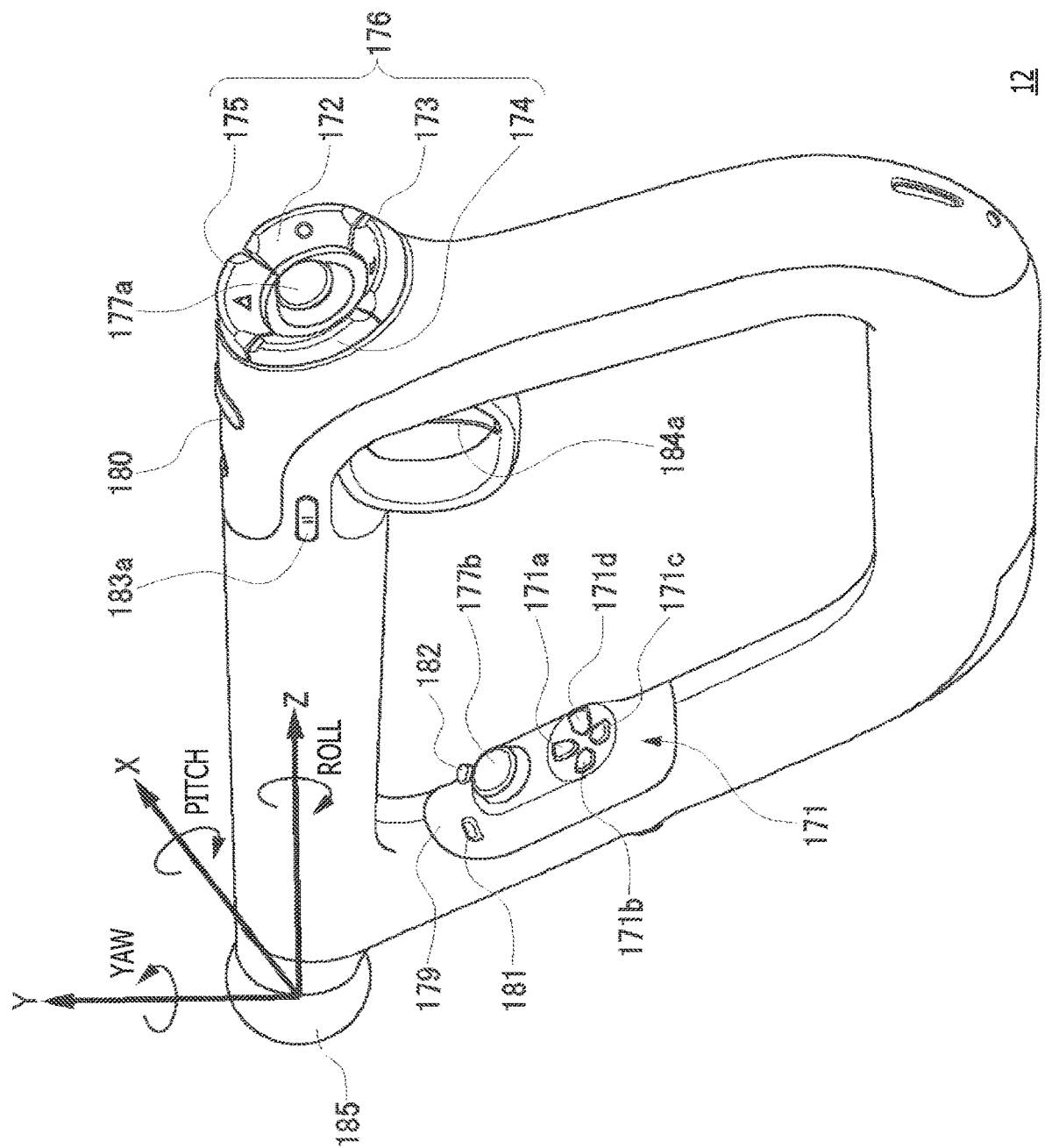
FIG. 3 is a perspective view of a second controller.

FIG. 3 is a perspective view of the second controller 12. In the embodiment, a three-dimensional coordinate system of the second controller 12 is set as depicted in FIG. 3 and an X axis, a Y axis and a Z axis are determined as a pitch axis, a yaw axis and a roll axis, respectively. The second controller 12 for a gun shooting game is configured such that it basically includes all of the inputting units provided on the general-purpose first controller 6. Consequently, an inputting operation performed in the first controller 6 can be performed also in the second controller 12.

Referring to FIGS. 2A and 2B, a circle mark button 172, a cross mark button 173, a square mark button 174 and a triangle mark button 175 included in operation buttons 176 correspond to the circle mark button 72, cross mark button 73, square mark button 74 and triangle mark button 75 included in the operation buttons 76, respectively. An upward button 171a, a leftward button 171b, a downward button 171c and a rightward button 171d included in direction buttons 171 correspond to the upward button 71a, leftward button 71b, downward button 71c and rightward button 71d included in the direction buttons 71, respectively. A touch pad 179, a home button 180, a SHARE button 181, an OPTIONS button 182, an R1 button 183a and an R2 button 184a correspond to the touch pad 79, home button 80, SHARE button 81, OPTIONS button 82, R1 button 83a and R2 button 84a, respectively. Analog sticks 177a and 177b correspond to the right analog stick 77a and the left analog stick 77b, respectively. A light emitting unit 185 that emits light in an arbitrary color is provided at a tip end of the second controller 12.

The second controller 12 has a shape simulating a gun, and, for example, in a first person shooting (FPS) game, the user can shoot a gun by a pulling operation of the R2 button 184a configured as a trigger switch. In the gun shooting game, an immersion feeling in the game to the user can be enhanced by an intuitive operation using the second controller 12 that is a gun controller.

Figure 4:
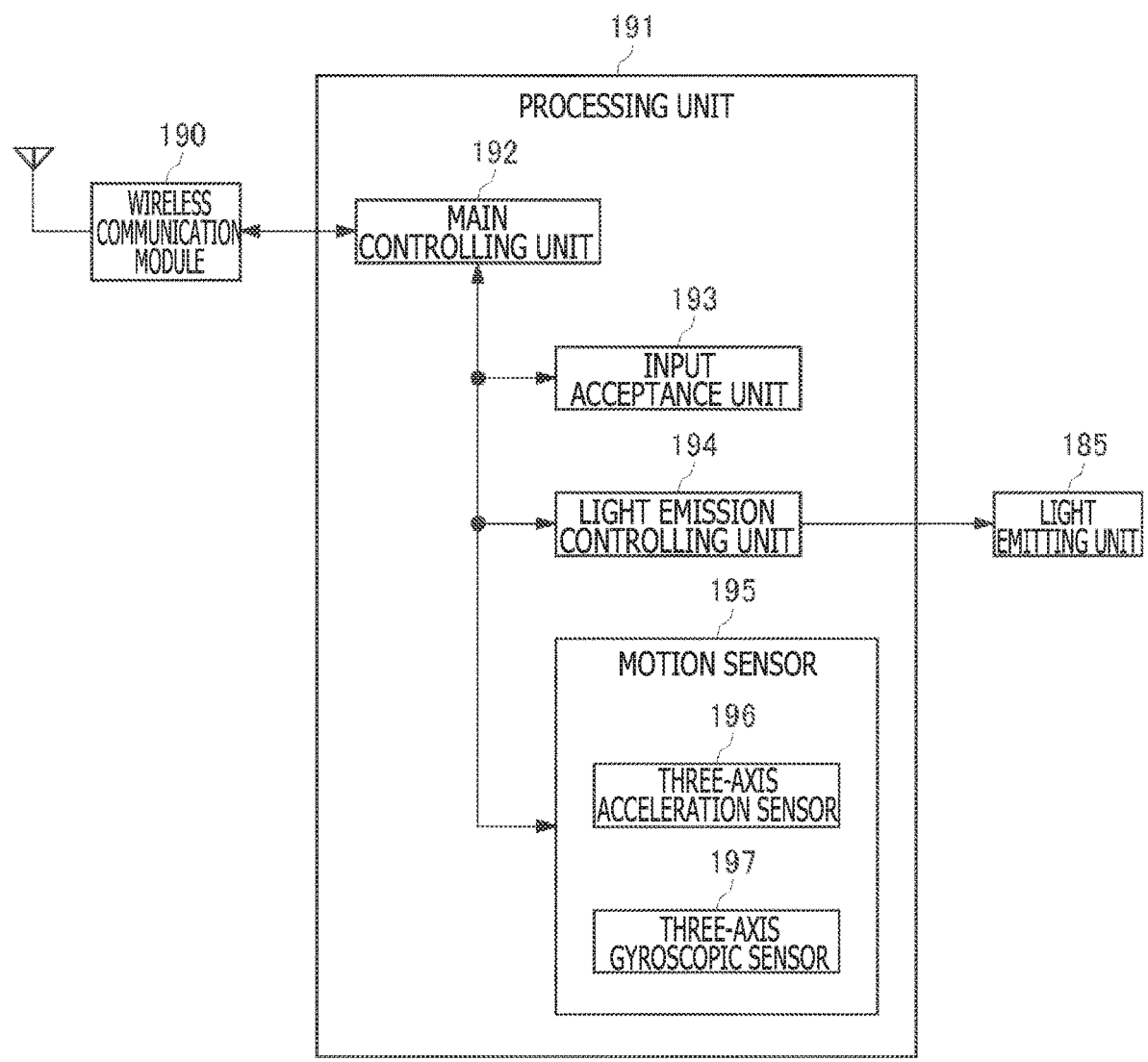
FIG. 4 is a view depicting an internal configuration of the second controller.

FIG. 4 depicts an internal configuration of the second controller 12. The second controller 12 includes a wireless communication module 190, a processing unit 191 and a light emitting unit 185. The wireless communication module 190 has a function for transmitting and receiving data to and from a wireless communication module of the information processing device 10. The processing unit 191 includes a main controlling unit 192, an input acceptance unit 193, a light emission controlling unit 194 and a motion sensor 195, and executes a desired process in the second controller 12. The main controlling unit 192 performs transmission and reception of necessary data to and from the wireless communication module 190.

The input acceptance unit 193 accepts and sends operation signals of various inputting units such as the direction buttons 171 and operation buttons 176 to the main controlling unit 192. The main controlling unit 192 supplies the received operation signals to the wireless communication module 190, and the wireless communication module 190 transmits the received operation signals to the information processing device 10 in a predetermined cycle. It is to be noted that the main controlling unit 192 may convert the received operation signals into predetermined controlling signals as occasion demands.

The light emission controlling unit 194 controls light emission of the light emitting unit 185. For example, the information processing device 10 may transmit light emission color information that designates an emission light color of the light emitting unit 185 such that the light emission controlling unit 194 may turn on the light emitting unit 185 in the designated light emission color.

The motion sensor 195 includes a three-axis acceleration sensor 196 and a three-axis gyroscopic sensor 197 and detects a motion of the second controller 12. The three-axis acceleration sensor 196 detects acceleration components in three axial directions of X, Y and Z of the second controller 12. The three-axis gyroscopic sensor 197 detects angular velocities around the X axis, Y axis and Z axis. The main controlling unit 192 accepts detection value signals from the three-axis acceleration sensor 196 and the three-axis gyroscopic sensor 197, and the wireless communication module 190 transmits the detection value signals (sensor signals) to the information processing device 10 in a predetermined cycle together with operation signals of the inputting unit.

Figure 5:
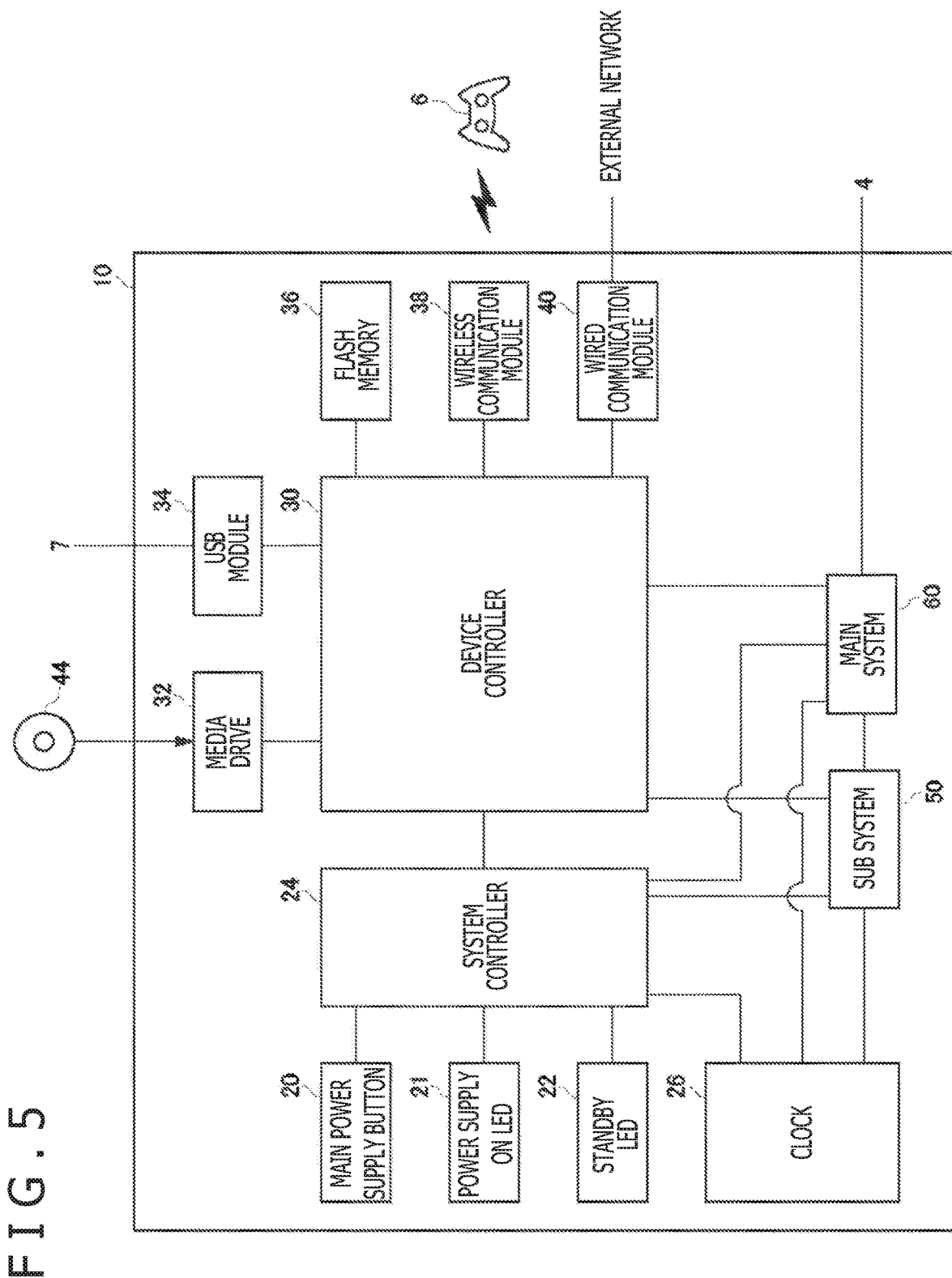
FIG. 5 is a view depicting a functional block configuration of an information processing device.

FIG. 5 depicts functional blocks of the information processing device 10. The information processing device 10 includes a main power supply button 20, a power supply ON LED 21, a standby LED 22, a system controller 24, a clock 26, a device controller 30, a media drive 32, a USB (Universal Serial Bus) module 34, a flash memory 36, a wireless communication module 38, a wired communication module 40, a sub system 50 and a main system 60.

The main system 60 includes a main CPU (Central Processing Unit), a memory that is a main storage device and a memory controller, a GPU (Graphics Processing Unit) and so forth. The GPU is utilized mainly for an arithmetic operation process of a game program. The functions just described may be configured as a system-on-chip and may be formed on one chip. The main CPU has a function for activating system software and executing a game under an environment provided by the system software.

The sub system 50 includes a sub CPU, a memory that is main storage device and a memory controller, and so forth but does not include a GPU. The sub CPU operates within a period within which the main CPU is in a standby state, and the processing function of the sub CPU is limited to suppress its power consumption low.

The main power supply button 20 is provided on a front face of the housing of the information processing device 10, and is operated to switch on or off of the power supply to the main system 60. The power supply ON LED 21 lights up when the main power supply button 20 is switched on, and the standby LED 22 lights up when the main power supply button 20 is switched off.

The system controller 24 detects depression of the main power supply button 20 by the user. The clock 26 is a real time clock and generates and supplies time and date information at present to the system controller 24, the sub system 50 and the main system 60.

The device controller 30 is configured as an LSI (Large-Scale Integrated Circuit) that executes delivery of information between devices like a south bridge. As depicted in FIG. 5, the devices such as the system controller 24, media drive 32, USB module 34, flash memory 36, wireless communication module 38, wired communication module 40, sub system 50 and main system 60 are connected to the device controller 30. The device controller 30 controls a timing of data transfer absorbing a difference in electric characteristics between the devices or a difference in data transfer speed between the devices.

The media drive 32 is a drive device that receives and drives a ROM (Read Only Memory) medium 44, in which application software of a game or the like and license information are recorded, mounted thereon to read out a program, data and so forth from the ROM medium 44. The ROM medium 44 is a read-only recording medium such as an optical disk, a magneto-optical disk, a Blu-ray disk or the like.

The USB module 34 is a module for connecting to an external device such as the camera 7 through a USB cable. The flash memory 36 is an auxiliary storage device that configures an internal storage. The wireless communication module 38 performs wireless communication with the first controller 6 and the second controller 12 in accordance with a communication protocol such as the Bluetooth (registered trademark) protocol or IEEE802.11 (Institute of Electrical and Electronics Engineers 802.11) protocol. The wired communication module 40 performs wired communication with an external device and connects to a network, for example, through an AP (Access Point).

In the embodiment, the information processing device 10 is a dedicated game machine, and the first controller 6 is a general-purpose game controller. All of games executed by a dedicated game machine are configured so as to operate on the basis of a game operation signal from the first controller 6. Further, as described above, all games operate on the basis of a game operation signal generated by an operation of the inputting units of the second controller 12 by the user.

On the other hand, the object of the user who uses the second controller 12 resides in that a command is inputted intuitively by moving or changing the posture of the second controller 12. Therefore, if game software does not have a capability for processing a detection value of a motion sensor 195, then the significance is poor in that the user uses the second controller 12. Naturally, since game software fabricated before the second controller 12 is sold does not premise use of the second controller 12, frequently it does not have a function for processing a detection value of the motion sensor 195. Therefore, the information processing device 10 of the embodiment provides a countermeasure that allows a user to use the second controller 12 also in a game that is not ready for the second controller 12 by converting a motion sensor signal of the second controller 12 into a game operation signal.

Figure 6:
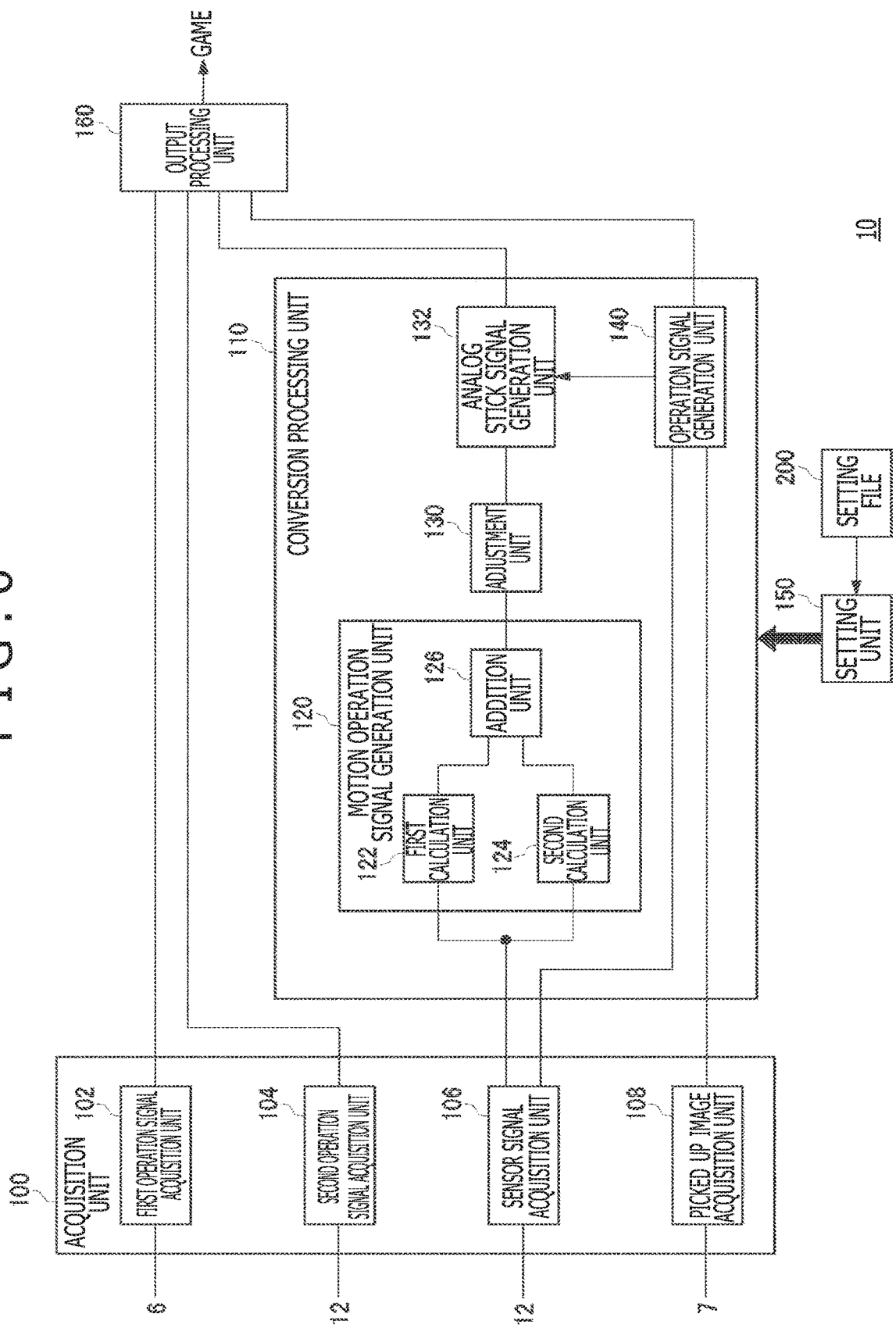
FIG. 6 is a view depicting a configuration of the information processing device.

FIG. 6 depicts a configuration of the information processing device 10 that provides an operation signal of the first controller 6 to a game. The information processing device 10 includes an acquisition unit 100, a conversion processing unit 110, a setting unit 150 and an output processing unit 160. The acquisition unit 100 includes a first operation signal acquisition unit 102 that acquires an operation signal of the inputting units of the first controller 6, a second operation signal acquisition unit 104 that acquires an operation signal of the inputting units of the second controller 12, a sensor signal acquisition unit 106 that acquires a detection value signal of the motion sensor 195 of the second controller 12 and a picked up image acquisition unit 108 that acquires an image picked up by the camera 7. The conversion processing unit 110 has a function for converting the detection value of the motion sensor 195 into an operation signal of the inputting units of the first controller 6 and supplying the converted signal to a game that cannot process the detection value of the motion sensor 195 of the second controller 12, and includes a motion operation signal generation unit 120, an adjustment unit 130, an analog stick signal generation unit 132 and an operation signal generation unit 140.

In FIG. 6, the elements described as the functional blocks that perform various processes can be configured in hardware from a circuit block, a memory and some other LSI and is implemented in software by system software or the like loaded in the memory. Accordingly, it is understood by those skilled in the art that the functional blocks can be implemented in various forms only by hardware, only by software or by a combination of hardware and software, and the implementation of the functional blocks is not limited to one of the various forms.

The first operation signal acquisition unit 102 acquires and supplies an operation signal of any inputting unit of the first controller 6 to the output processing unit 160, and the output processing unit 160 provides the operation signal of the inputting unit of the first controller 6 to the game.

Further, the second operation signal acquisition unit 104 acquires and supplies an operation signal of any inputting unit of the second controller 12 to the output processing unit 160, and the output processing unit 160 provides the operation signal of the inputting unit of the second controller 12 to the game. The game can process the operation signal of the inputting unit of the controller.

In an FPS game, the right analog stick 77a of the first controller 6 and the analog stick 177a of the second controller 12 (hereinafter represented by the "right analog stick 77a") are used for a viewpoint operation of a character. The right analog stick 77a is biased by a spring or the like so as to maintain a center position, and, if the right analog stick 77a is tilted from the center position by the user, then it outputs an operation signal that indicates an analog value indicative of the tilted two-dimensional position, namely, movement amounts of an X axis component and a Y axis component upon movement from the center position. The X axis component and the Y axis component are utilized for a viewpoint movement in the leftward and rightward direction and a viewpoint movement in the upward and downward direction, respectively. The output processing unit 160 performs a rounding process for the operation signal of the right analog stick 77a to generate an operation signal of the X axis component and the Y axis component represented by digital values of 8 bits and then provides the generated signal to the game.

Figure 7A:
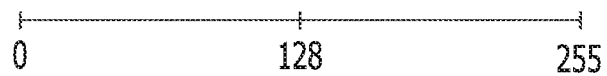
FIGS. 7A to 7C are views depicting an output range of a right analog stick.

FIG. 7A depicts an output range of a one-axis component of the right analog stick 77a. The output processing unit 160 performs a rounding process for each of axial components of the operation signal of the right analog stick 77a and outputs the X axis component and the Y axis component as integral values from 0 to 255.

Figure 7B:
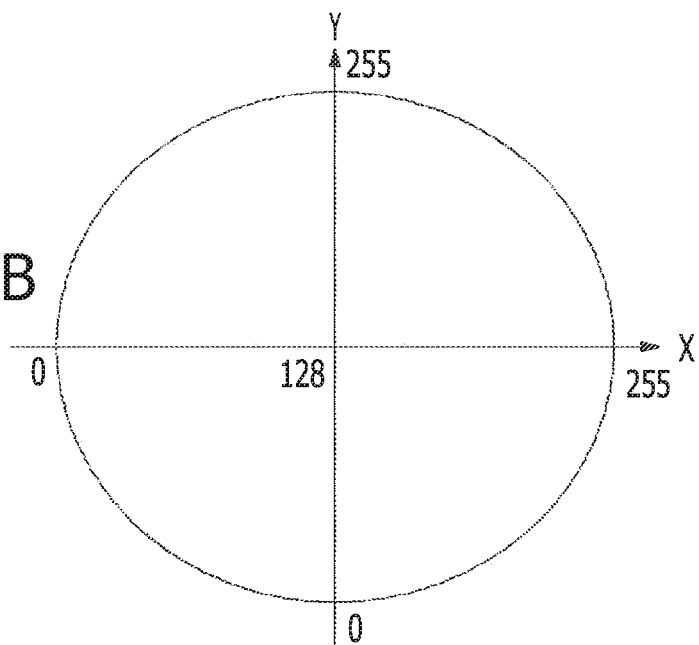

FIG. 7B depicts an output range of the X axis component and the Y axis component of the right analog stick 77a. When the right analog stick 77a is placed at the center position, the output processing unit 160 provides an operation signal in which the signal value of the X axis component is 128 and the signal value of the Y axis component is 128 to the game.

Frequently, a game does not accept an operation signal in the overall output range of the right analog stick 77a as a valid input but sets a dead zone for an operation in the proximity of the center position such that a signal value in the dead zone is ignored. One of reasons is that, since the accuracy of a position sensor provided in the right analog stick 77a is not very high, the possibility cannot be denied that an operation signal indicating that the right analog stick 77a is displaced from the center position (128, 128) may be outputted even if the user does not touch the right analog stick 77a. Further, as a different reason, since the user places the right thumb at a top portion of the right analog stick 77a, the right analog stick 77a is sometimes moved by a movement of shivering of the right thumb even if the user does not have a will for operation. Therefore, the game sets a dead zone for an operation in the proximity of the center position of the right analog stick 77a while an operation outside the dead zone is accepted as a valid viewpoint operation input.

Figure 7C:
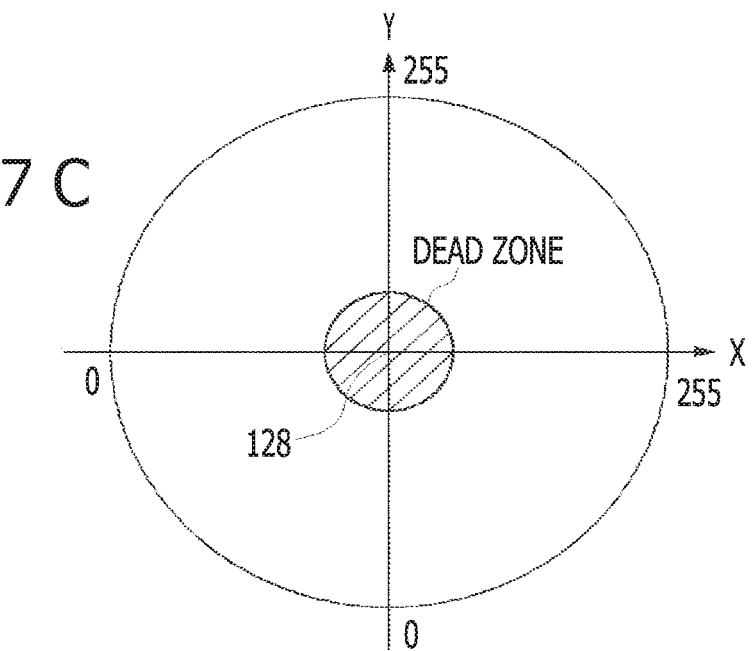

FIG. 7C depicts an example of a dead zone set by a game to an output range of the right analog stick 77a. In this example, the dead zone is set as a circular range of a predetermined diameter centered at the center position (128, 128). The game may freely set a range of the dead zone and may set, for example, the dead zone as a rectangular range centered at the center position. The game ignores an operation signal included in the dead zone, namely, does not reflect the operation signal on processing of the game.

If the user moves the second controller 12 so as to move a viewpoint, then the information processing device 10 of the embodiment performs a process for converting the movement into a viewpoint operation input, namely, an operation input of the right analog stick 77a. Further, if the user causes the second controller 12 to perform a predetermined movement (motion), then the information processing device 10 performs, in addition to the viewpoint operation, a process for converting the movement into an operation input to the game. It is to be noted that the second controller 12 includes inputting units similar to those of the first controller 6 such that the user can perform an operation input to the game by operating the inputting units. In the embodiment, the information processing device 10 supports an intuitive operation input through a movement of the second controller 12 by the user.

In order to make is possible to utilize a movement (motion) of the second controller 12 as an operation input to the game, the information processing device 10 acquires a setting file 200, in which data for converting motions of the second controller 12 into operation signals of the first controller 6 are described, from an external server. It is to be noted that, if the setting file 200 is included in game software, then the information processing device 10 acquires the setting file 200 from the game software. In the setting file 200, a sensitivity adjustment value, data for configuring a conversion curve for converting a motion operation signal into an operation signal of the right analog stick 77a, data relating to the output dead zone, a motion threshold value for detecting a predetermined motion, a stopping threshold value for stopping conversion into an operation signal of the right analog stick 77a, a priority order of motions and so forth are described.

<Conversion Process into Right Analog Stick Signal>

First, a process of the information processing device 10 when it generates an operation signal of the right analog stick 77a using a detection value of the motion sensor 195 of the second controller 12 is described. Basically, the information processing device 10 generates an output of an X axis component of the right analog stick 77a (utilized for a viewpoint operation in the leftward and rightward direction) using an angular velocity round the yaw axis among detection values of the three-axis gyroscopic sensor 197 and generates an output of the Y axis component of the right analog stick 77a (utilized for a viewpoint operation in the upward and downward direction) using an angular velocity around the pitch axis. It is to be noted that, upon generation of an X axis component of the right analog stick 77a, the angular velocity around the yaw axis and the acceleration in the pitch axis direction are utilized.

Figure 8:
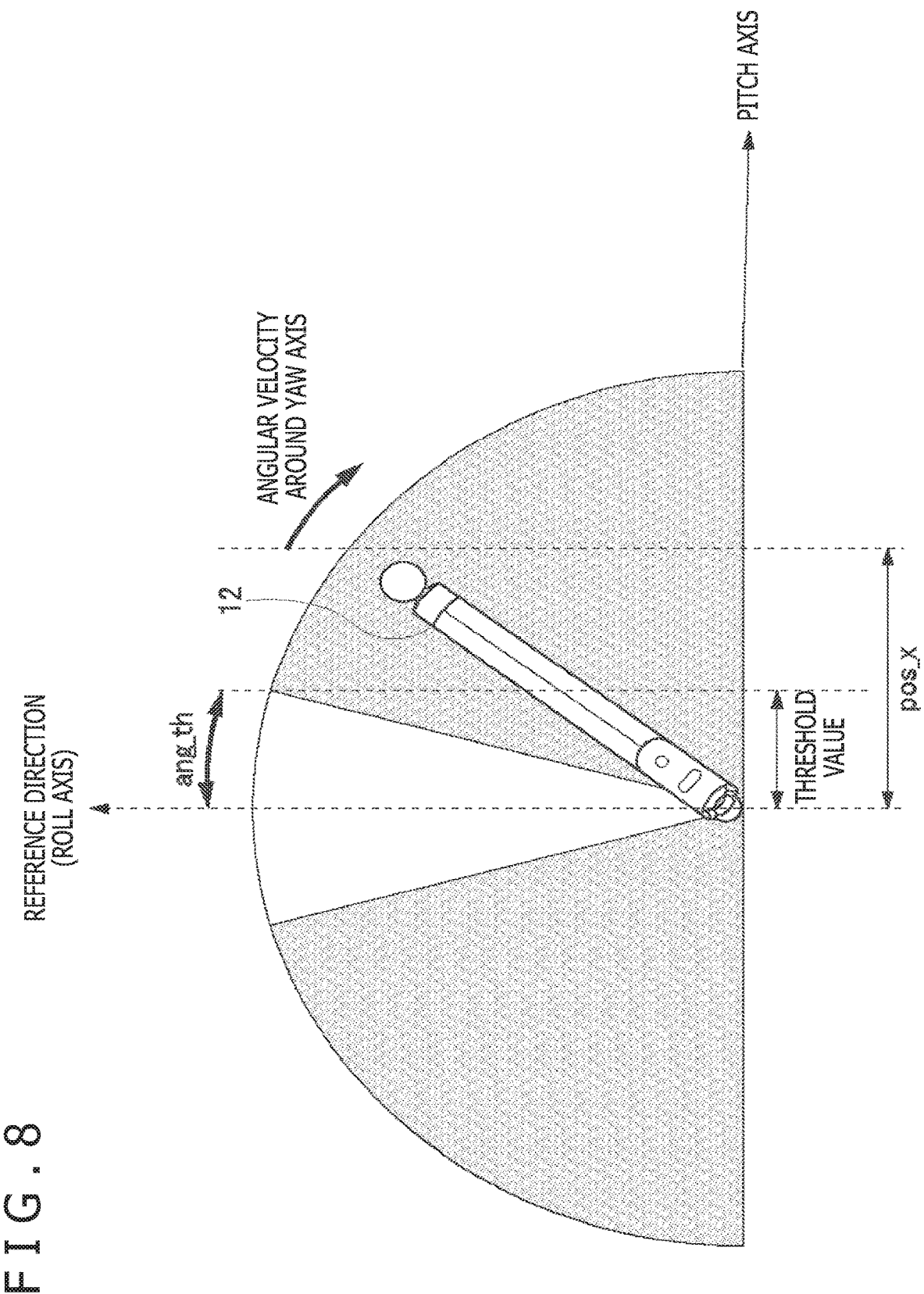
FIG. 8 is a view illustrating a method for generating a motion operation signal.

FIG. 8 is a view illustrating a method for generating a motion operation signal for converting a right analog stick signal on the basis of a detection value of the motion sensor 195. In FIG. 8, a generation technique for an x axis component of a motion operation signal to be converted into an X axis component of the right analog stick 77a is depicted. Upon generation of a motion operation signal, it is necessary for the user to set a reference direction of the second controller 12, and, for example, before starting of the game, the user would operate a predetermined button in a state in which the second controller 12 is directed to the outputting device 4 such that the reference direction is set.

The motion operation signal generation unit 120 includes a first calculation unit 122, a second calculation unit 124 and an addition unit 126. It is to be noted that, upon generation of an x axis component of a motion operation signal, both the first calculation unit 122 and second calculation unit 124 are operated, and, upon generation of a y axis component of a motion operation signal, the second calculation unit 124 does not operate. The reason of this is hereinafter described.

The sensor signal acquisition unit 106 acquires and supplies a detection value of the motion sensor 195 incorporated in the second controller 12 to the motion operation signal generation unit 120. The motion operation signal generation unit 120 executes a generation process of an x axis components of a motion operation signal to be converted into an X axis component of the right analog stick 77a using the angular velocity around the yaw axis.

The first calculation unit 122 calculates a first signal (x1) from the angular velocity around the yaw axis detected by the three-axis gyroscopic sensor 197. Here, the first calculation unit 122 calculates the first signal (x1) in the following manner using the angular velocity (wy) around the Y axis, namely, around the yaw axis:

$x1 = \omega y \times \text{sensitivity}$ where the sensitivity (sensitivity adjustment value) is set appropriately in response to the detection sensitivity of the three-axis gyroscopic sensor 197.

Further, separately from the first calculation unit 122, the second calculation unit 124 calculates a second signal (x2) according to a deviation between a direction in which the second controller 12 is directed and the reference direction. Here, the second calculation unit 124 calculates the second signal (x2) in the following manner taking it as a condition that the direction in which the second controller 12 is directed exceeds a predetermined angular threshold value (ang_th) from the reference direction:

when pos_x>0

$x2 = \text{scale} \times (pos\_x - \text{threshold value})$ when pos_x<0

$x2 = \text{scale} \times (pos\_x + \text{threshold value})$.

Here, it is assumed that the radius of a semicircle depicted in FIG. 8 is equal to an overall length L of the second controller 12. scale is a coefficient for adjusting the sensitivity, and (threshold value) is a predetermined length on the pitch axis determined by the angular threshold value (ang_th) and is calculated by L×sin (ang_th).

The second calculation unit 124 may calculate a movement amount (pos_x) in the pitch axis direction to calculate a second signal by utilizing an integration value of the angular velocity around the yaw axis detected by the motion sensor 195 or integrating the acceleration in the pitch axis direction. The addition unit 126 generates an x axis component of a motion operation signal by adding the first signal (x1) and the second signal (x2) and outputs the generated x axis component to the adjustment unit 130.

It is to be noted that the second calculation unit 124 calculates the second signal when the deviation (variation amount) between the direction in which the second controller 12 is directed and the reference direction exceeds the angular threshold value (ang_th). Accordingly, if the deviation does not exceed the angular threshold value (ang_th), then the output of the second calculation unit 124 becomes zero and the addition unit 126 outputs the first signal as the motion operation signal to the adjustment unit 130. In this case, the X axis component of the right analog stick 77a is determined in accordance with the first signal (x1), namely, the magnitude of the angular velocity around the yaw axis.

In the case where the deviation (variation amount) exceeds the angular threshold value (ang_th), since the second signal is by the second calculation unit 124, the addition unit 126 can output a motion operation signal not equal to zero to the adjustment unit 130 even in the case where the second controller 12 stands still (namely, the angular velocity around the yaw axis is zero and the first signal has the zero value). As a result, the game can rotate the line-of-sight direction of a character around the yaw axis, and the user can confirm a manner around the same. The x axis component of a motion operation signal to be converted into an X axis component of the right analog stick 77a is such as described above.

Now, generation of a y axis component of a motion operation signal to be converted into a Y axis component of the right analog stick 77a is described. The motion operation signal generation unit 120 executes a generation process of a y axis component of a motion operation signal to be converted into a Y axis component of the right analog stick 77a using the angular velocity around the pitch axis.

The first calculation unit 122 calculates a first signal (y1) from the angular velocity around the pitch axis detected by the three-axis gyroscopic sensor 197. Here, the first calculation unit 122 calculates the first signal (y1) using an angular velocity (ωx) around the X axis, namely, around the pitch axis as follows:

$$y1 = \omega x \times \text{sensitivity}.$$

sensitivity (sensitivity adjustment value) is set appropriately in response to the detection sensitivity of the three-axis gyroscopic sensor 197.

As described above, upon generation of a y axis component of a motion operation signal, the second calculation unit 124 does not operate. While the Y axis component of the right analog stick 77a is utilized for a viewpoint operation in the upward and downward direction, a situation in which, in a game, the user wants to rotate the line-of-sight direction continuously around the pitch axis occurs less frequently, and the estrangement from the line-of-sight movement in the real world is great. Therefore, the second calculation unit 124 of the embodiment is configured such that, while it calculates the second signal that is reflected on the X axis component of the analog stick signal, it does not calculate the second signal that is reflected on the Y axis component of the analog stick signal.

As described above, the motion operation signal generation unit 120 generates an x axis component and a y axis component of a motion operation signal corresponding to an X axis component and a Y axis component of the analog stick signal and outputs the generated components to the adjustment unit 130.

Figure 9:
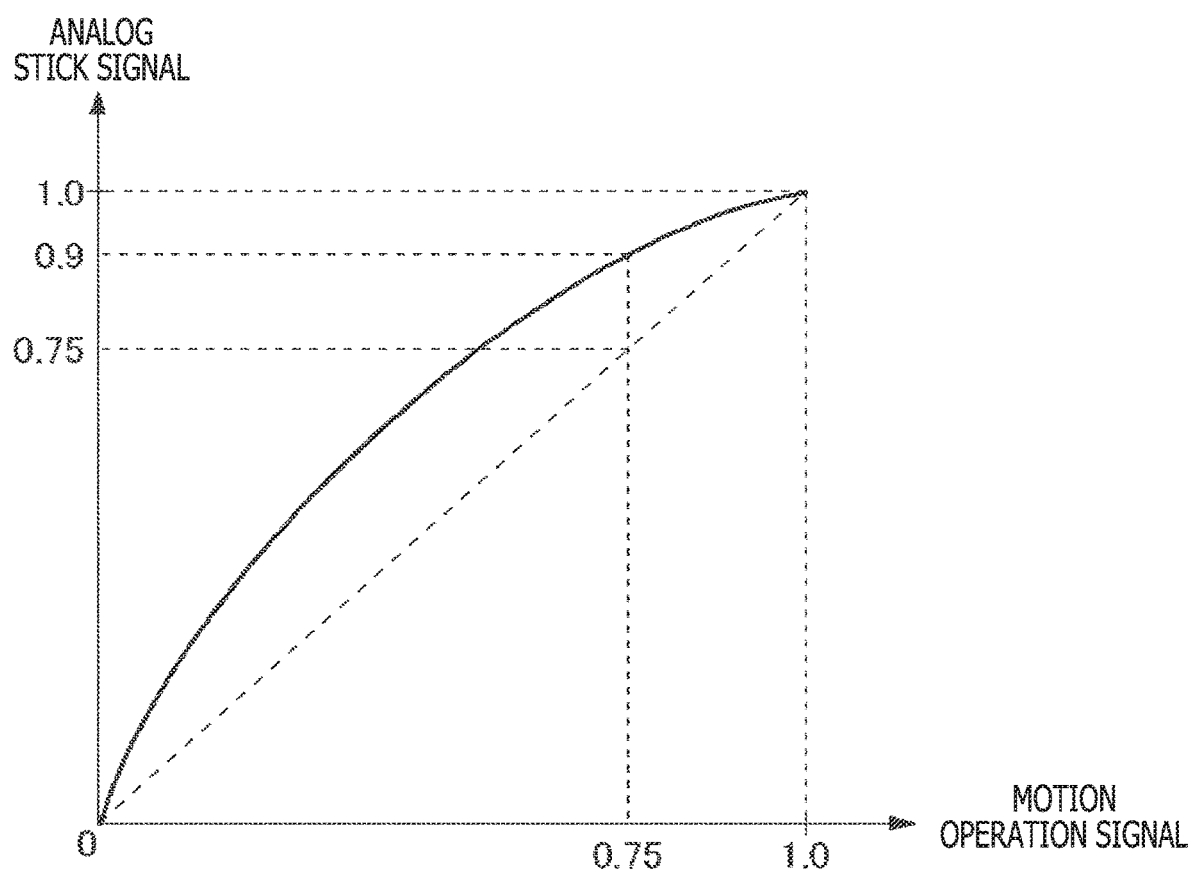
FIG. 9 is a view depicting an example of a conversion curve.

FIG. 9 depicts an example of a conversion curve for converting a motion operation signal into an operation signal of the right analog stick. The abscissa axis of the conversion curve represents the motion operation signal of the second controller 12, and a signal value "1.0" indicates a signal value when the motion operation signal (x1+x2) calculated by the addition unit 126 becomes equal to or higher than a predetermined value. The axis of ordinate represents the operation signal of the right analog stick 77a, and the right analog stick signal of "1.0" indicates a maximum value of the tilt amount.

According to this conversion curve, for example, when the signal value of the motion operation signal is 0.75, the operation signal of the right analog stick 77a is set to 0.9. If the (right analog stick signal)/(motion operation signal) is defined as "amplification factor," then the conversion curve defines an amplification factor of the right analog stick signal with respect to a normalized motion operation signal.

The setting unit 150 acquires a setting file 200 corresponding to a game and provides the setting file 200 to the conversion processing unit 110. Preferably, if game software is activated, then the setting unit 150 automatically acquires the setting file 200 from an external server or game software and provides the setting file 200 to the conversion processing unit 110.

The second controller 12 transmits a detection value of the motion sensor 195 in a predetermined cycle to the information processing device 10. The transmission cycle of the second controller 12 is set shorter than a cycle (for example, 60 fps) in which the game generates a game screen image. The sensor signal acquisition unit 106 acquires a sensor signal outputted in a predetermined cycle and supplies the sensor signal to the conversion processing unit 110. The conversion processing unit 110 converts the sensor signal into an operation signal of an inputting unit including the right analog stick 77a, and the output processing unit 160 provides the operation signal after conversion to the game.

FIGS. 10A to 10E are views illustrating a conversion process of a motion sensor signal by the conversion processing unit 110.

Figure 10A:
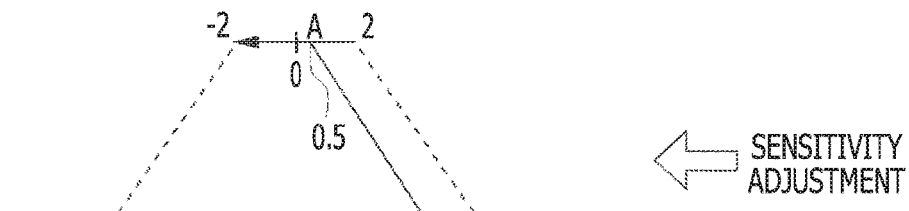

FIG. 10A depicts a range of the gyro sensor signal. The motion operation signal generation unit 120 generates a first signal using the gyro sensor signal. It is to be noted that the x-axis component of the motion operation signal is generated by addition of a second signal calculated by the second calculation unit 124 described hereinabove. In FIG. 10A, the value "2" indicated as an end of the range indicates a tentative maximum value of the gyro sensor signal operated by the user during game play and does not signify that the maximum value of the gyro sensor signal is restricted to 2. In the following, a flow when the gyro sensor signal value A (=0.5) is converted into a signal value E of the right analog stick 77a by the conversion processing unit 110 is described.

The sensor signal acquisition unit 106 supplies a sensor signal value to the motion operation signal generation unit 120. The motion operation signal generation unit 120 generates a motion operation signal using the sensor signal value. It is to be noted that the motion operation signal generation unit 120 may generate a motion operation signal after the signal value of a predetermined range (for example, a range of −0.016 to 0.016) of the gyro sensor signal is set to 0 in order to remove the influence of vibration by camera shake.

Figure 10B:
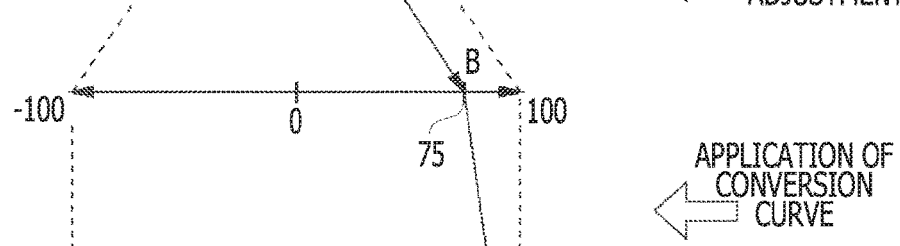

FIG. 10B depicts ranges for axial components of a motion operation signal. The motion operation signal generation unit 120 performs sensitivity adjustment using a sensitivity adjustment value (sensitivity, scale) included in the setting file 200 to generate a motion operation signal (x1+x2). Here, a motion operation signal value B (=75) is calculated from the gyro sensor signal value A (=0.5) and supplied to the output processing unit 160.

The adjustment unit 130 applies the conversion curve to the motion operation signal.

Figure 10C:
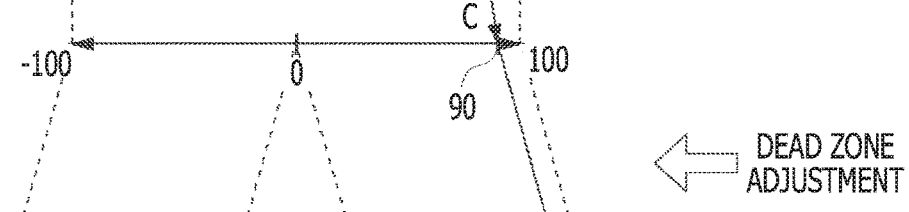

FIG. 10C depicts a state in which the conversion curve is applied. The adjustment unit 130 multiplies the motion operation signal by an amplification factor determined from the conversion curve depicted in FIG. 9. If, in the conversion curve depicted in FIG. 9, the amplification factor corresponding to the signal value of 75 after sensitivity adjustment is 1.2, then the adjustment unit 130 multiplies the signal value B by 1.2 to convert the same into a signal value C (=90).

The adjustment unit 130 adds a signal component corresponding to a dead zone set to the right analog stick 77a to the motion operation signal to which the conversion curve is applied. The adjustment unit 130 causes the motion operation signal not to indicate a signal value in the dead zone by adding a signal component corresponding to the dead zone to the motion operation signal. It is to be noted that the signal part corresponding to the dead zone may be set in response to the signal value after application of the conversion curve. In particular, in order to reduce the influence of vibration by camera shake, the signal part, which corresponds to the dead zone, of a low signal value is set such that the output is reduced further.

FIG. 10D depicts an output range for the axial components where the dead zone is adjusted. Here, the range of −30 to +30 corresponds to the dead zone, and the adjustment unit 130 adds 30 to the signal value C to convert the signal value C into a signal value D (=120). It is to be noted that, if the signal value C is in the negative, then the adjustment unit 130 adds −30 to the signal value C to convert the signal value C into a signal value D. In this manner, the adjustment unit 130 determines the sign (positive/negative) of the dead zone signal part to be added in response to the sign of the signal value C. In the case where the signal value C is 0, the adjustment unit 130 does not carry out the addition process of the dead zone signal part.

It is to be noted that, in the case where the dead zone is set to a circular shape with respect to the center position of the right analog stick 77a as depicted in FIG. 7C, the value to be added as the dead zone to the motion operation signal varies in response to the x-axis component and the y-axis component of the motion operation signal.

Figures 11, 12:
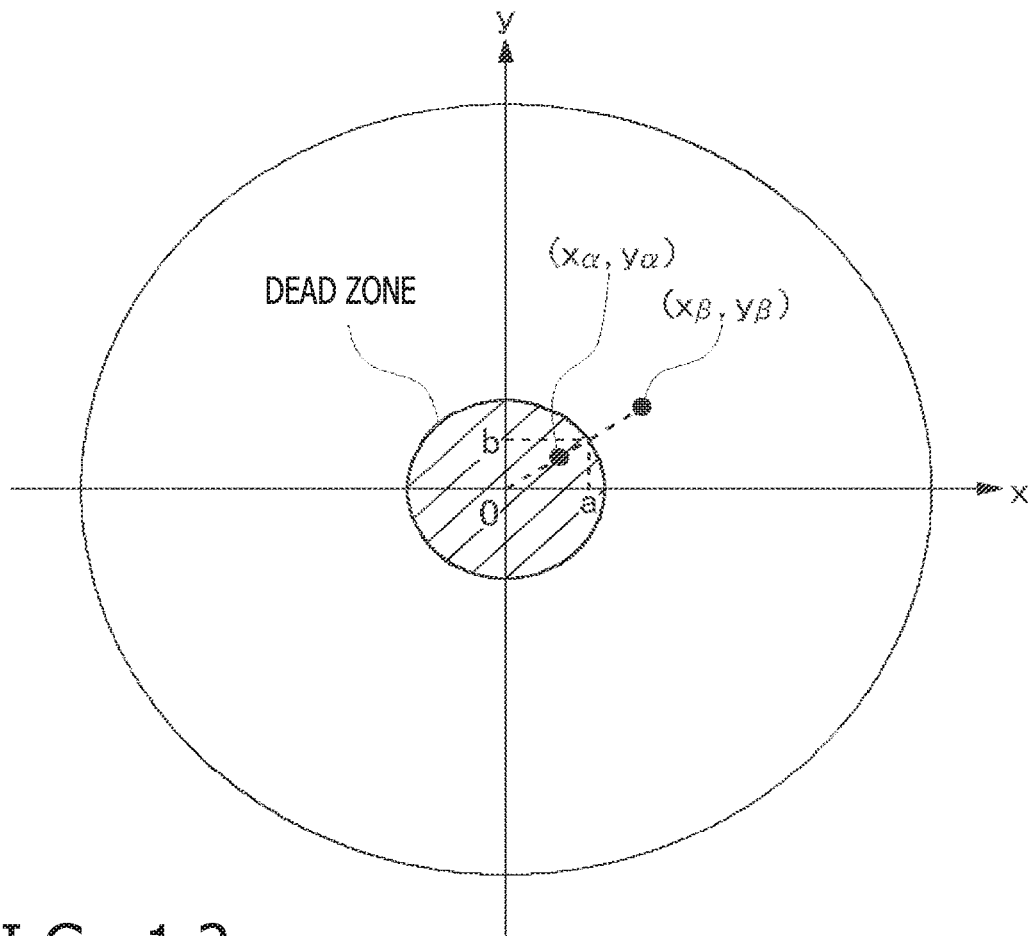
FIG. 11 is a view illustrating an adjustment process.
FIG. 12 is a view illustrating a rounding process.

FIG. 11 is a view illustrating an adjustment process by the adjustment unit 130. A signal part corresponding to the dead zone is added in a direction in which the angle (Arctan(yα/xα)) is to be maintained to the motion operation signal (xα, yα) to which the conversion curve is applied.

In the case where the dead zone is formed in a circular shape, the adjustment unit 130 determines a cross point (a, b) between a straight line that passes (xα, yα) from the origin and a border portion of the dead zone. Here, a is a signal part corresponding to the dead zone of the x-axis component, and b is a signal part corresponding to the dead zone of the y-axis component. Consequently, the adjustment unit 130 adds a signal part (a, b) corresponding to the dead zone to the motion operation signal (xα, yα) to generate a motion operation signal (xβ, yβ) for which the signal value of the dead zone is adjusted. Here, xβ=xα+a and yβ=yα+b. The adjustment unit 130 can implement a viewpoint movement that does not provide discomfort to the user by generating a motion operation signal to which a signal part of the dead zone is added while the angle of the motion operation signal (xα, yα) is maintained.

The motion operation signal whose dead zone is adjusted is supplied to the analog stick signal generation unit 132. The analog stick signal generation unit 132 generates an operation signal of the right analog stick 77a from the motion operation signal.

Figure 10E:
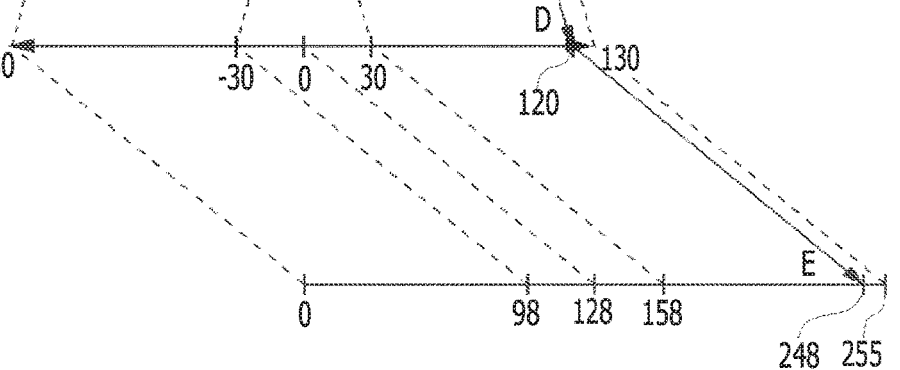

FIG. 10E depicts a manner in which an analog stick signal is generated from the motion operation signal. Since the analog stick signal assumes a value from 0 to 255, the analog stick signal generation unit 132 carries out a process for adjusting the output range depicted in FIG. 10D to the output range of the analog stick signal.

The center position of the right analog stick 77a is 128, and the analog stick signal generation unit 132 adds 128 to the signal value depicted in FIG. 10D to generate an analog stick signal. The analog stick signal generation unit 132 adds 128 to the signal value D to generate a signal value E (=248) of the operation signal of the right analog stick 77a.

It is to be noted that the analog stick signal generation unit 132 sets the signal value as a result of the addition of 128 to the signal value to the signal value 0 when the signal value is smaller than 0 and sets the signal value to the signal value 255 when the signal value is greater than 255. In short, in regard to a signal value outside the range of 0 to 255, a signal value of 0 to 255 is set.

Further, since the analog stick signal assumes an integer value from 0 to 255, the analog stick signal generation unit 132 carries out a rounding process of the motion operation signal for the signal value of a result of the addition of 128 to the motion operation signal value to convert the signal value into an integral value.

FIG. 12 is a view illustrating a rounding process. In the case where the game generates a game screen image at 60 fps, the analog stick signal generation unit 132 carries out the rounding process for every generation cycle of a frame, namely, for each ⅟60 second.

In FIG. 12, "Signal value" is a signal value in the current cycle in which 128 is added to the motion operation signal. "Signal value to which rounding error in preceding cycle is added" is a signal value to which a rounding error in the preceding rounding process is added. "Signal value after rounding process" is a signal value obtained by rounding "Signal value after rounding error in preceding cycle is added" to integer to carry out a rounding process in the current cycle. "Rounding error" is the difference between "Signal value after rounding error in preceding cycle is added" and "Signal value after rounding process" and is a rounding error in the rounding process in the current cycle.

When the rounding error in the Nth rounding process is 0.4, the analog stick signal generation unit 132 adds, in the (N+1)th rounding process, the rounding error (0.4) in the preceding cycle to the signal value (125.3) in the current cycle to carry out a rounding process to generate an operation signal value (126) of the right analog stick 77a. Consequently, the rounding error in the (N+1)th rounding process becomes −0.3.

In the (N+2)th rounding process, the analog stick signal generation unit 132 adds the rounding error (−0.3) in the preceding cycle to the signal value (132.6) in the current cycle to carry out a rounding process to generate an operation signal value (132) of the right analog stick 77a. Consequently, the rounding error in the (N+2)th rounding process becomes 0.3.

In this manner, the analog stick signal generation unit 132 carries out a rounding process after it adds the rounding error in the rounding process for the motion operation signal in the preceding cycle to the motion operation signal in the current cycle. By carrying out the rounding process in this manner, the analog stick signal generation unit 132 can cause the rounding error in the preceding cycle to be included into the operation signal of the right analog stick 77a in the current cycle. Consequently, an operation signal of the right analog stick 77a on which a movement of the second controller 12 by the user is reflected with high accuracy can be generated. The analog stick signal generation unit 132 supplies the generated operation signal of the right analog stick 77a to the output processing unit 160. The output processing unit 160 supplies the operation signal of the right analog stick 77a to the game.

In the embodiment, since the conversion processing unit 110 converts the motion operation signal into an analog stick signal, the conversion timing can be controlled freely. For example, in the case where the game creates a screen image at 60 fps, the conversion processing unit 110 may set the cycle of the conversion timing to ⅟60 second. Further, the conversion processing unit 110 may convert the motion operation signal into an analog stick signal in accordance with a timing at which the game requests the operation signal.

<Conversion Process into Inputting Unit Operation Signal>

In the following, a conversion process into an operation signal of an inputting unit other than the right analog stick 77a is described. The conversion processing unit 110 converts a detection value of the motion sensor 195 acquired by the sensor signal acquisition unit 106 into an operation signal of an inputting unit of the first controller 6, and the output processing unit 160 provides the operation signal after the conversion to the game.

In regard to the conversion process into an inputting unit operation signal, a correspondence relationship by which the inputting unit of the first controller 6 is made correspond to a predetermined motion of the second controller 12 is described in the setting file 200.

FIG. 13 depicts the correspondence relationship between motions of the second controller 12 and inputting units of the first controller 6. It is to be noted that, although "Character movement" indicates a movement of a character in the game and is depicted for the convenience of description, since this is a matter that must only be grasped by the game side, it may not be described in the setting file 200.

For example, at an upper stage of the correspondence table, it is indicated that rolling of the second controller 12 in a forward rotation direction corresponds to an inputting operation of the square mark button 74 of the first controller 6. Whether or not each motion is established is decided by the operation signal generation unit 140 in the conversion processing unit 110. Here, in regard to whether or not the motion of "ROTATE," "TILT_UP," "MOVE_UP" or "MOVE_FORWARD" is established, the operation signal generation unit 140 makes a decision using a detection value of the motion sensor 195 acquired by the sensor signal acquisition unit 106. Meanwhile, in regard to whether or not the motion of "AIM" is established, the operation signal generation unit 140 makes a decision using a picked up image acquired by the picked up image acquisition unit 108.

FIG. 14 is a view illustrating a motion detection technique by the operation signal generation unit 140. The operation signal generation unit 140 monitors the detection value in a predetermined rotation direction or axial direction of the motion sensor 195. The detection value monitored here is an angular velocity in the forward rotation direction around the roll axis in regard to "ROTATE," an angular velocity in the forward rotation direction around the pitch axis in regard to "TILT_UP," an angular velocity in the yaw axis forward direction in regard to "MOVE_UP" and an acceleration in the roll axis negative direction in regard to "MOVE_FORWARD."

Here, for the angular velocity in the forward rotation direction around the roll axis, angular velocity in the forward rotation direction around the pitch axis, acceleration in the yaw axis positive direction and acceleration in the roll axis in negative direction that are monitoring targets, motion threshold values for deciding establishment of the motions are set. Also the motion threshold values may be described in the setting file 200. As depicted in FIG. 14, the operation signal generation unit 140 decides motion establishment if the detection value that is a monitoring target of the motion sensor 195 exceeds the motion threshold value therefor, and generates an operation signal of the corresponding inputting unit. For example, in the case where the sensor value depicted in FIG. 14 indicates an angular velocity in the forward rotation direction around the roll axis, the operation signal generation unit 140 generates an operation signal of the square mark button 74 for a period of time from time t1 to time t2 and supplies the operation signal to the output processing unit 160. In this manner, the user can input a command to the game by moving the second controller 12.

It is to be noted that, to the plurality of motions of the second controller 12, a priority order for detection may be set. For example, if the four motions described above are lined up in descending order of the priority, then they may be lined up as

"TILT_UP">"ROTATE">"MOVE_FORWARD">"MOVE_UP."

The priority order of the motions is set in accordance with corresponding character movements.

The operation signal generation unit 140 generates an operation signal of an inputting unit of the first controller 6 on the basis of the priority order set to the plurality of motions of the second controller 12. In particular, during detection of a motion having a high priority and while a predetermined period of time (for example, 500 milliseconds) elapses after an end of the detection, the operation signal generation unit 140 stops detection of any other motion that is lower in priority. By setting a priority order to the motions in this manner, a situation in which a plurality of motions are detected simultaneously and a character moves by a plurality of commands is evaded.

A motion threshold value is set to a value that is not exceeded by the sensor value in a state in which the user uses the second controller 12 in a normal state such that the operation signal generation unit 140 does not detect the motion although the user has no intention to cause the second controller 12 to perform the motion. In other words, the motion threshold value is set such that, only when the user quickly moves the second controller 12 in a predetermined rotation direction or axial direction, the operation signal generation unit 140 detects a corresponding motion.

As described hereinabove, the analog stick signal generation unit 132 in the conversion processing unit 110 generates a signal of the right analog stick 77a used for a viewpoint operation of a character from a motion operation signal derived from an angular speed around the yaw axis, an angular velocity around the pitch axis and an acceleration in the pitch axis direction. In the case where the user tries to cause the second controller 12 to perform a predetermined motion, if the point of view of the character moves, then the game screen image to be outputted to the outputting device 4 changes, and therefore, there is a problem that it becomes rather difficult to perform a later game operation. Therefore, if the detection value of the motion sensor 195 exceeds a stopping threshold value that is lower than the motion threshold value, then outputting of the operation signal for the analog stick to the output processing unit 160 may be stopped by the analog stick signal generation unit 132 in order to avoid a useless viewpoint movement.

FIG. 15 is a different view illustrating a motion detection technique by the operation signal generation unit 140. As depicted in FIG. 15, the stopping threshold value for stopping outputting of an analog stick signal by the analog stick signal generation unit 132 is set lower than the motion threshold value. Consequently, since the analog stick signal generation unit 132 does not supply an analog stick signal to the output processing unit 160 in a state in which the sensor value exceeds the stopping threshold value, the viewpoint movement of a character in the game is not performed anymore, and the user can play the game without any trouble.

It is to be noted that the analog stick signal generation unit 132 may supply the product of multiplication of the generated analog stick signal by an attenuation coefficient depicted in FIG. 15 to the output processing unit 160. The attenuation coefficient is determined such that it gradually increases the analog stick signal after the sensor values becomes lower than the stopping threshold value. Here, the attenuation coefficient is set such that, if the sensor value becomes lower than the stopping threshold value, then the attention coefficient recovers from 0 to 1 over 500 milliseconds. Consequently, since the analog stick signal generation unit 132 outputs a gradually increasing analog stick signal from a timing at which it is enabled to output an analog stick signal to the output processing unit 160, a smooth viewpoint movement of a character can be implemented.

In the following, a technique of the operation signal generation unit 140 deciding whether or not a motion of "AIM" is established is described. As described hereinabove, the operation signal generation unit 140 detects a motion of "AIM" using a picked up image acquired by the picked up image acquisition unit 108.

Figure 16:
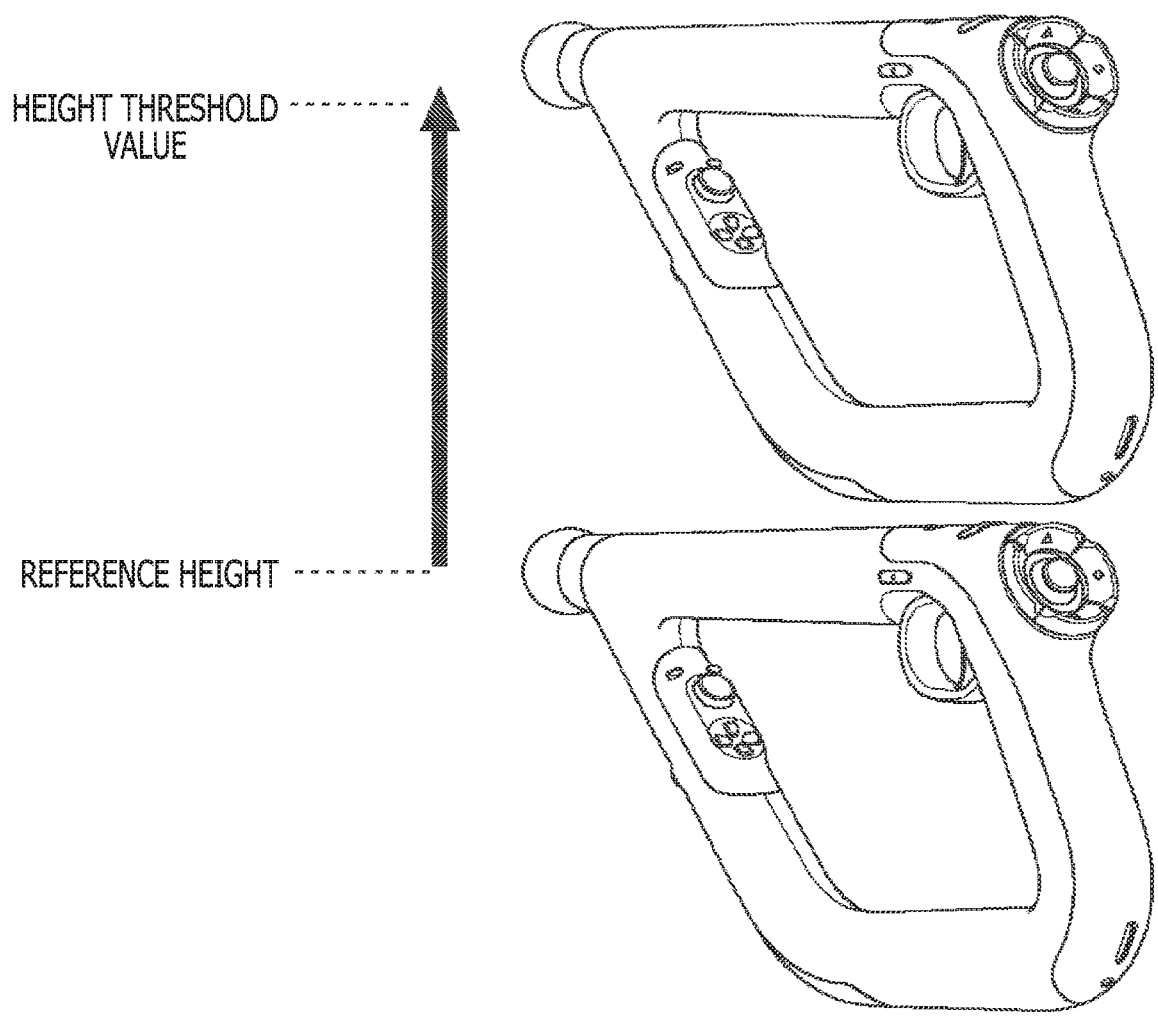
FIG. 16 is a view illustrating an aim motion detection technique.

FIG. 16 is a view illustrating an aim motion detection technique by the operation signal generation unit 140. The operation signal generation unit 140 decides, on the basis of the height of the light emitting unit 185 of the second controller 12 included in a picked up image, whether or not a motion of "AIM" is established. Here, a reference height for the light emitting unit 185 is determined before the game is started, and if the light emitting unit 185 moves upwardly by a distance equal to or greater than a predetermined height threshold value from the reference height, then the operation signal generation unit 140 detects an "AIM" motion. It is to be noted that, although it is described that the user operates a predetermined button in a state in which the second controller 12 is directed toward the outputting device 4 in order to determine a reference direction that is made a reference for generation of an analog stick signal before the game is started, also the reference height may be determined simultaneously.

It is to be noted that the "AIM" motion is a movement that becomes a trigger for aiming by a scope, and in a real battlefield, a solder would look into the scope with the gun held beside the face. In the case where a similar movement is requested to the user in a game world, for example, the operation signal generation unit 140 may detect an "AIM" motion when it confirms from a picked up image that the light emitting unit 185 exists in the proximity of the face of the user. For example, in the case where the distance between the face and the light emitting unit 185 is equal to or smaller than a predetermined length, the operation signal generation unit 140 detects an "AIM" motion. If the operation signal generation unit 140 detects an "AIM" motion, then it supplies an operation signal of the L2 button 84b to the output processing unit 160.

In the embodiment described above, in a game in which a detection value of the motion sensor 195 of the second controller 12 cannot be processed, the conversion processing unit 110 converts a detection value of the motion sensor 195 into an operation signal of an inputting unit of the first controller 6. The system software of the information processing device 10 may issue an inquiry to the game about whether a detection value of the motion sensor 195 can be processed, and activate, in the case where a detection value cannot be processed, the module of the conversion processing unit 110 to provide the detection value of the motion sensor 195 to the conversion processing unit 110.

It is to be noted that some gun shooting game is directed such that, if a gun is fired, then the muzzle is raised by a rebound and then is directed such that, if the shooting of the gun is stopped, then the muzzle lowers to its original position. Since the aiming at the target deviates if the muzzle is raised by a rebound, the user would carry out a technique (recoil control) of operating the right analog stick 77a toward a downward direction so as to suppress rise of the muzzle thereby to maintain the aiming at the target. In the following, it is assumed that a target during a game exists in a horizontal direction for the convenience of description.

While the user is shooting a gun using the second controller 12 that is a gun controller, by gradually tilting the second controller 12 in a downward direction (in the negative rotation direction around the pitch axis) to carry out recoil control, rise of the muzzle by a rebound of the gun can be suppressed thereby to keep the aiming horizontally. As a result, while the gun continues shooting, the user will steadily tilt the second controller 12 downwardly in order to keep the aiming horizontally. Therefore, if, after the shooting of the gun ends, the user tilts the second controller 12 in a downwardly direction state toward an upward direction to restore to the original posture (horizontal posture), then the gun during the game is directed upwardly as much from the horizontal state.

In the embodiment, if the user tilts the second controller 12 toward a downward direction while pulling the R2 button 184a that is a trigger switch, then the operation signal generation unit 140 decides that the user is carrying out recoil control. For example, when the second controller 12 is tilted toward a downward direction by a predetermined angle or more while the R2 button 184a is pulled, the operation signal generation unit 140 may decide that recoil control is being carried out. After the user ends the shooting of the gun (after the user releases the R2 button 184a), the user would return the second controller 12 in the downwardly direction state to its original posture (horizontal direction). At this time, the analog stick signal generation unit 132 does not transmit, to the output processing unit 160, an analog stick signal corresponding to a movement for tilting the second controller 12 upwardly by an amount corresponding to the tilt amount by which the second controller 12 has been tilted downwardly by the recoil control. In particular, in the case where the second controller 12 is tilted relatively upwardly by an amount corresponding to the tilt amount by which second controller 12 is tilted downwardly by the recoil control (in the case where the posture tilted toward the downward direction is returned to its original horizontal posture), the analog stick signal generation unit 132 does not output, to the output processing unit 160, an analog stick signal corresponding to the relative tilt amount toward the upward direction. Consequently, even if the second controller 12 is returned from its downward direction to the original horizontal posture after the recoil control, an analog stick signal corresponding to the movement is not transmitted to the game, and therefore, during the game, the gun can be maintained in a horizontal state.

The present disclosure has been described with reference to the embodiment. The embodiment is exemplary, and it can be recognized by those skilled in the art that various modifications can be made to combinations of the components and the processes and that also such modifications are included in the scope of the present disclosure.

In the description of the embodiment, it is stated that the conversion processing unit 110 converts a detection value of the motion sensor 195 incorporated in the second controller 12 into an operation signal of an inputting unit. The conversion processing unit 110 may have a function capable of converting a detection value representing a detected movement of the second controller 12 into an operation signal of an inputting unit irrespective of the detection value of the motion sensor 195. The conversion processing unit 110 may derive a detection value representing a detected movement of the second controller 12 from a picked up image of the second controller 12, for example, by the camera 7 and convert the detection value into an operation signal of an inputting unit.

What is claimed is:

1. An information processing device that provides an operation signal of an analog stick to a game, comprising:
  a conversion processing unit configured to convert a detection value obtained by detection of a movement of a controller into an analog stick signal; and
  an output processing unit configured to provide the analog stick signal obtained by the conversion to the game;
  wherein:
  the conversion processing unit implementing the conversion includes:
  a first calculation unit configured to calculate a first signal from a detected angular velocity,
  a second calculation unit configured to calculate a second signal according to a deviation amount between a direction in which the controller is directed and a reference direction,
  an addition unit configured to add the first signal and the second signal to generate a motion operation signal, and
  an analog stick signal generation unit configured to generate the analog stick signal from the motion operation signal, and
  wherein, when the conversion processing unit detects that recoil control is carried out in a gun shooting game, the conversion processing unit does not transmit the analog stick signal, which corresponds to the movement for tilting the controller in an upward direction, to the output processing unit after the recoil control is carried out.

2. The information processing device according to claim 1, wherein, when the deviation amount exceeds a given angular threshold value, the second calculation unit calculates the second signal.

3. The information processing device according to claim 1, wherein the second calculation unit integrates an angular velocity or an acceleration detected by a motion sensor to calculate the second signal.

4. The information processing device according to claim 1, wherein
  the analog stick signal is configured from an X-axis component and a Y-axis component, and
  the second calculation unit calculates the second signal that is reflected on the X-axis component of the analog stick signal but does not calculate the second signal that is reflected on the Y-axis component of the analog stick signal.

5. A method for providing an operation signal of an analog stick to a game, comprising:
  converting a detection value obtained by detection of a movement of a controller into an analog stick signal; and
  providing the analog stick signal obtained by the converting to the game;
  wherein the converting includes:
  calculating a first signal from a detected angular velocity;
  calculating a second signal from a deviation between a direction in which the controller is directed and a reference direction;
  generating a motion operation signal by adding the first signal and the second signal; and
  generating the analog stick signal from the motion operation signal,
  wherein, during the converting, when recoil control is detected in a gun shooting game, the converting and the providing steps do not include transmitting the analog stick signal, which corresponds to the movement for tilting the controller in an upward direction, to the game after the recoil control is carried out.

6. A non-transitory, computer readable storage medium containing a program, which when executed by a computer, causes the computer to perform a method of providing an operation signal of an analog stick to a game, by carrying out actions, comprising:
  converting a detection value obtained by detection of a movement of a controller into an analog stick signal; and
  providing the analog stick signal obtained by the converting to the game;
  wherein the converting includes:
  calculating a first signal from a detected angular velocity;
  calculating a second signal from a deviation between a direction in which the controller is directed and a reference direction;
  generating a motion operation signal by adding the first signal and the second signal; and
  generating the analog stick signal from the motion operation signal,
  wherein, during the converting, when recoil control is detected in a gun shooting game, the converting and the providing steps do not include transmitting the analog stick signal, which corresponds to the movement for tilting the controller in an upward direction, to the game after the recoil control is carried out.

* * * * *